Sept. 22, 1964 H. BAUER 3,149,995

MAGNETIC RECORDING ELEMENT AND METHOD OF PREPARATION THEREOF

Filed June 13, 1961

INVENTOR.
HERBERT BAUER
BY
W.S. Hill
AGENT 3,149,995
MAGNETIC RECORDING ELEMENT AND METHOD OF PREPARATION THEREOF
Herbert Bauer, Metuchen, N.J., assignor to Radio Corporation of America, a corporation of Delaware
Filed June 13, 1961, Ser. No. 116,761
20 Claims. (Cl. 117—66)

This invention relates to an improved magnetic recording element of the type comprising a base having a coating of magnetic particles in a polymeric binder. The invention includes also a novel method for preparing the improved recording element.

A common type of magnetic recording element, which is also referred to herein as a magnetic tape, comprises a flexible base or tape having a surface coated with magnetic particles in a synthetic thermoplastic polymeric binder. A typical magnetic tape comprises a polyester base coated with acicular gamma iron oxide particles in a polyvinyl chloride binder. Such magnetic tape, when used in electronic data processing machines must withstand extreme mechanical abuse. In many data processing machines, the tape is moved at speeds of up to 150 inches per second with the coating in physical contact with stationary metal parts, such as tape guides and transducer heads. Due to this physical contact with the stationary metal parts, many of the presently used tape coatings are rapidly abraded. Some of the magnetic material which is abraded from the coating deposits in the equipment, adversely affecting its operation. Also, due to poor abrasion resistance, many of the presently used magnetic tapes start to show pin holes through the coating after relatively few passes through the machine.

In order to improve the abrasion resistance of the coating, it has been suggested to use a crosslinked or cured diisocyanate based elastomer as the binder in the coating. Such coatings may be prepared by first dispersing magnetic particles in a nonaqueous solvent containing an isocyanate-terminated prepolymer. The prepolymer may be prepared in known manner, as by reacting higher molecular weight organic compounds which have two terminal hydroxyl groups with a molar excess of an organic diisocyanate to produce an isocyanate-terminated reaction product. The dispersion, or coating mixture, is then coated on a base, dried, and then cured. Such coatings exhibit markedly better abrasion resistance than previous coatings. However, long milling times are required to disperse the magnetic particles in the prepolymer. Further, the step of curing (crosslinking the elastomer) takes a longer period of time to complete than is economical on conventional coating equipment.

An object of this invention is to provide an improved magnetic recording element.

A further object is to provide a magnetic recording tape which exhibits high resistance to abrasion and wear, and which may be manufactured conveniently and economically on conventional coating equipment.

Another object is to provide a method for preparing the magnetic recording element of the invention.

In general, the magnetic recording element of the invention comprises a base, such as an oriented polyethylene terephthalate film, having a coating thereon comprising magnetic particles dispersed in a binder. The binder consists essentially of 5 to 75 weight percent of a polymeric matrix material and the balance of an elastomer. The polymeric matrix material is at least one copolymer selected from a particular group of soluble hydroxyl-group-bearing copolymer resins having a molecular weight of at least 2000. The elastomer is selected from a particular group of cross-linked diisocyanate-based compositions. The particular groups are defined in detail below.

The coating of the improved recording element of the invention exhibits markedly better abrasion resistance than similar coatings comprising thermoplastic polymeric binders used in present commercial magnetic tapes. The coating of the recording element of the invention is also superior in its magnetic characteristics to coatings of similar recording elements which consist essentially of magnetic particles dispersed in a crosslinked diisocyanate based elastomer (without a polymeric matrix material). In the recording element disclosed herein, the adhesion of the binder to the base is more than adequate to withstand the severe conditions encountered in data processing equipment. The flexibility of the coating may be adjusted within wide limits by a proper selection of chain-extending agents and isocyanate-containing intermediates, and by adjusting the proportion of elastomer to polymeric matrix material. In addition, the recording element of the invention may be manufactured with conventional coating equipment.

In the method of the invention, a coating mixture is provided comprising magnetic particles dispersed in a non-aqueous solvent containing the polymeric matrix material and an isocyanate-terminated prepolymer. The coating mixture is coated upon a base and then dried to non-tackiness in a matter of minutes. Then, over a period of hours or days, the prepolymer in the coating is reacted with a bifunctional compound until the prepolymer is converted or cured by crosslinking to a diisocyanate-based elastomer. In one embodiment, the bifunctional compound is included in the coating mixture and curing can be carried out by storing rolls of the coated base at temperatures between 40° and 130° C. for at least 2 hours. In another embodiment, the curing can be carried out by storing rolls of the coated base in an atmosphere which contains a bifunctional compound such as air at room temperature having a relative humidity between 60 and 100% for at least 12 hours. In the latter embodiment, the bifunctional compound is water.

By using the polymeric matrix material, the coating mixture may be coated on a base, dried to non-tackiness, and wound in rolls in a matter of minutes with conventional coating equipment. Then, subsequent to winding in rolls, the dry coating may be cured in wound form over an extended period of time to develop the desired abrasion resistance. Other advantages in the use of a polymeric matrix material in the recording element of the invention are described below.

The invention is described in more detail in the following portion of the specification in conjunction with the accompanying drawing in which.

Figure 1:
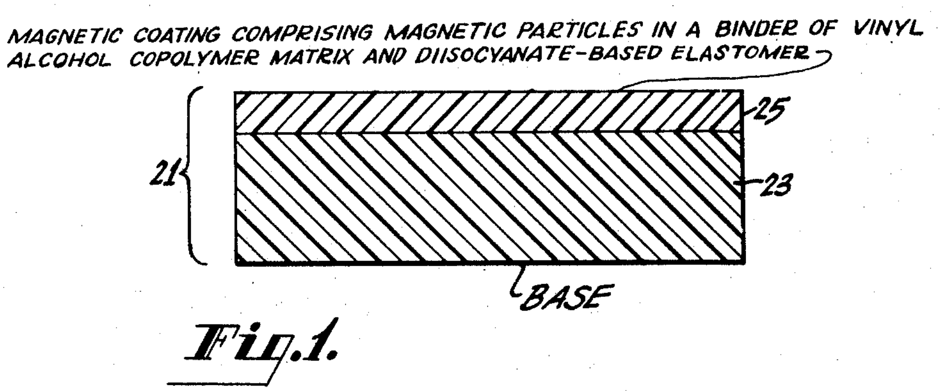
FIGURE 1 is a sectional view of a typical recording element of the invention.

A recording element 21 of the invention is illustrated in FIGURE 1. The recording element 21 comprises a base 23 having a surface coating 25 of the magnetic particles in a binder comprising 5 to 75 weight percent of a polymeric matrix material selected from a particular group of hydroxyl-group-bearing copolymer resins and the balance a diisocyanate-based elastomer.

The base 23 functions as a support for the entire structure. The base may be in any geometrical form such as a disc or a drum; and may be of any convenient material such as glass, plastic or metal. The particular base 23 is an oriented polyethylene terephthalate film. Some such films are marketed by the E. I. du Pont de Nemours and Co., Inc., Wilmington, Delaware, under the trademark Mylar. Other suitable bases are made of paper, cellulose acetate, and oriented polyvinyl chloride. The base 23 is typically 1.5 mils thick; although other thicknesses, preferably between 0.50 and 2.5 mils, may be used. The base 23 may be any width, for example, between 0.25 and 2.0 inches wide; and may be of any length, usually thousands of feet long.

Any of the usual magnetic particles may be used in the recording elements of the invention. For example, one may use metallic particles, such as iron particles; or oxidic particles, such as gamma iron oxide, magnetite, or a mixed ferrite, such as zinc ferrous ferrite. The preferred materials are of the oxidic type, are elongated or acicular in shape and are preferably between 0.2 and 2.0 microns long, 0.02 to 0.6 micron wide, and with an average length-to-width ratio between about 2 to 20 but usually about 6.

The binder for the coating 25 is a feature of the invention. There are few coating compositions and binders which satisfy all of the necessary requirements for recording elements to be used in electronic data processing equipment. For such use, the coating must be abrasion resistant, flexible, resilient, chemically stable, and strongly adherent to the base.

The binder consists essentially of 5 to 75 weight percent of polymeric matrix material and the balance of a diisocyanate-based elastomer. The polymeric matrix material consists essentially of at least one solid, soluble, thermoplastic copolymer of from 0.5 to 50 weight percent vinyl alcohol and the balance at least one member of the group consisting of vinyl esters, vinyl acetals, vinyl halides, and vinylidene halides, and having a molecular weight of at least 2000. Representative materials include copolymers of vinyl alcohol with vinyl acetate, copolymers of vinyl alcohol with vinyl butyral, copolymers of vinyl alcohol with vinyl chloride and vinyl acetate, and copolymers of vinyl alcohol with vinylidene chloride and vinyl acetate.

The diisocyanate-based elastomers used in the magnetic recording element of the invention consist essentially of units having the formula, $$\left[-NX-\left(B-NH-\overset{O}{\overset{\|}{C}}-O-G-O-\overset{O}{\overset{\|}{C}}-NH\right)_n-\left(B-NX-R\right)_m-\right]$$

wherein O—G—O is a bivalent, polymeric radical obtained by removing the terminal active hydrogen atoms from a polymeric organic compound having a molecular weight of at least 750 selected from the group consisting of: (1) polyalkyleneether glycols, (2) polyalkylene-aryleneether glycols, (3) polyalkylene-ether-thioether-glycols, (4) polyalkylene-aryleneether-thioether-glycols, (5) linear, dihydroxy terminated polyesters, (6) linear, dihydroxy-terminated polyester amides; B is a bivalent, non-polymeric organic radical which is inert to isocyanate groups. R is a bivalent radical consisting of carbonyl, nonpolymeric diacyl radicals and nonpolymeric carbamyl radicals. X is a hydrogen radical or a bivalent radical consisting of nonpolymeric dicarbamyl radicals and of polymeric dicarbamyl radicals where said polymeric dicarbamyl radicals consist essentially of units having the general formula:

$$-CO-NH-(B-NH-CO-O-G-O-CO-NH)_n-B-NH-CO-B$$

and O—G—O and $n$ are the same as in the main chain defined above. X is preferably comprised of hydrogen and of polymeric carbamyl radicals of the type described in the molar ratio between 1 and 2000. And, $n$ and $m$ are integers, and the ratio $n/m$ is between 1 and 1000.

In the preparation of the diisocyanate-based elastomers, which are useful in the recording elements of the invention, one or more of the polymeric organic compounds, from which the polymeric segment O—G—O is obtained, may be reacted with a molar excess of an organic diisocyanate $B(NCO)_2$ to form an isocyanate-terminated prepolymer. The prepolymer may then be chain-extended with a non-polymeric bifunctional compound such as water, a glycol or a diamine.

The polymeric organic compound has a higher molecular weight (molecular weight above 750) and two terminal hydroxyl groups and is selected from the group consisting of (1) polyalkyleneether glycols, such as polytetramethyleneether glycol, polyethyleneether glycol, polypropyleneether glycol and poly-1, 2-butyleneether glycol, (2) polyalkylene-aryleneether glycols, (3) polyalkylene-ether-thioether glycols, (4) polyalkylene-aryleneether-thioether glycols (5) linear, dihydroxy terminated polyesters, such as are prepared in a known manner by esterification of dihydric alcohols, such as ethylene glycol, diethylene glycol, propylene glycol, 1,4-butylene glycol with dibasic organic acids such as adipic acid, glutaric acid, suberic acid, sebaccic acid and 2-ethyl suberic acid, and (6) linear, dihydroxy-terminated polyester amides.

Any of a wide variety of organic diisocyanates may be used in the reaction including aromatic, aliphatic and cycloaliphatic diisocyanates and combinations of these types. Representative compounds include tolylene-2,4-diisocyanate, m-phenylene diisocyanate, 4-chloro-1,3-phenylene diisocyanate, 4,4'-biphenylene diisocyanate, 1,5-naphthalene diisocyanate, 1,6-hexamethylene diisocyanate, 1,4-cyclohexylene diisocyanate and 1,5-tetrahydronaphthalene diisocyanate.

The bifunctional compound, also referred to as the non-polymeric chain-extending agent, which may be used in the preparation of the diisocyanate-based elastomer may be selected from the group of bifunctional compounds having at least two hydrogen atoms capable of reacting with isocyanates. Some suitable bifunctional compounds are water, ethylene glycol, hexamethylene glycol, monoethanolamine, m-phenylenediamine, 4,4'-methylene dianiline and 4,4-methylene-bis-(2-chloroaniline).

A more detailed description of the chemistry and preparation of the elastomers of the type which are useful in the recording elements described herein appears in U.S. Patent 2,948,707 to Anthony F. Benning.

In the method of the invention, a coating mixture is provided comprising the magnetic particles dispersed in a non-aqueous solvent containing the polymeric matrix material and an isocyanate-terminated prepolymer. The coating mixture is coated on a base and then dried to non-tackiness in a matter of minutes, as by a conventional high speed coating machine. Then, over a period of hours or days, the prepolymer is reacted with a non-polymeric bifunctional compound to produce a cross-linked diisocyanate-based elastomer. This latter step is referred to as curing.

In one embodiment of the method of the invention, the bifunctional compound is included in the coating mixture. Curing can be carried out by storing rolls of the coated base at temperatures between 40° and 130° C. for at least 2 hours.

In another embodiment of the method of the invention, the bifunctional compound is not contained in the coating mixture. In this embodiment, curing can be carried out by storing rolls of the coated base in an atmosphere which contains a bifunctional compound for at least 12 hours at temperatures between 10° and 110° C. An example of such an atmosphere is air at room temperature, or temperatures between 10° and 110° C. having a relative humidity between 60 and 100%.

Two difficulties are encountered in the existing process of making recording elements which includes dispersing a magnetic material in an isocyanate-terminated prepolymer. First, the magnetic materials are only slowly wetted by the solutions of isocyanate-terminated prepolymers and long milling times are therefore required to achieve uniform dispersion. Secondly, curing rates of diisocyanate-based coating mixtures have to be adjusted to a compromise rate. A low curing rate is desired to allow sufficient time for filtering, storing and applying the coating mixture. A high curing rate is desired to transform the applied coating mixture which is still tacky after evaporation of the solvent to a non-tacky state in a minimum period of time. The use of a polymeric matrix material is a feature of the invention to overcome the above difficulties. The polymeric matrix material used in the invention aids in dispersing the magnetic materials so that uniform dispersions are achieved in shorter milling times. The use of a polymeric matrix material also results in a non-tacky coating after solvent evaporation from the applied coating mixture has taken place, when little or no curing has occurred. The polymeric matric material permits separation of the drying step from the curing step, and allows curing of the elastomer to be continued after winding the coated base into a roll.

Figure 2:
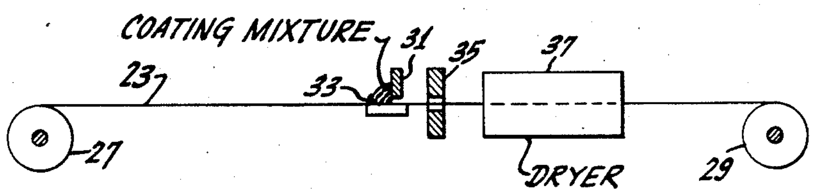
FIGURE 2 is a partially schematic, side view of an apparatus for carrying out the methods of the invention and, FIGURE 3 is a partially schematic, sectional view of an apparatus for testing the abrasion resistance of a magnetic coating.

The recording element 21 illustrated in FIGURE 1 may be prepared by the following process which is carried out in the continuous process apparatus of FIGURE 2. A base 23 of oriented polyethylene terephthalate film is provided in the form of a roll about 6 inches wide. The film is unwound from a feed roller 27 and passes, in order, through a coating station, an orienting station, and a drying region, and then is wound on a take up roller 29. The film 23 passes through the apparatus at any convenient speed. Speeds between 10 and 200 feet per minute may be used.

At the coating station, the base 23 passes under a doctor blade or knife 31, which has a quantity of a coating mixture 33 behind it. The coating mixture 33 comprises a dispersion of magnetic particles in a non-aqueous solution of the diisocyanate-based elastomer and a polymeric matrix material. The coating mixture 33 is applied to the surface of the base 23 to provide a dry coating between 0.1 and 2.0 mils thick, preferably about 0.5 mil thick. The coating mixture may be applied by any standand coating technique such as by dip coating, knife or doctor blade coating, transfer roll coating or gravure roll coating. Following application, the applied coating passes through a magnetic field to orient the magnetic particles therein in a desired direction. In the apparatus of FIGURE 2, the magnetic field is produced by two opposed magnets 35 above and below the base 23. These magnets produce a flat magnetic field parallel to the direction of travel of the base 23.

After orienting the magnetic particles, the coating is dried in a dryer 37 by evaporating the solvent therefrom. This drying solidifies the coating sufficiently to permit the coated base to be wound on the take-up roller 29, without sticking or blocking. Following drying, the coated base is cooled to room temperature and then wound on the take-up roller 29. It is necessary at this stage to cure the elastomer. Curing may be achieved by storing the wound roll for extended periods of one hour to several days at temperatures of 40–130° C. preferably at least 2 hours, to affect completion of the cross-linking reaction. Crosslinking may also be achieved by storing the wound roll in the presence of water vapor for an extended period of time of 6 to 96 hours. When this latter technique is used, it is preferred to store the roll in air having a relative humidity of 60 to 100% for at least 12 hours. The coated base may now be slit to any desired width. For purposes of this example, the slit width of the final product is 0.25 inch. All of the fabricating operations may be carried out in separate steps, combinations of steps, or in single series of continuous operations. Further, it may be desirable in some cases to precoat or pretreat the surface of the base prior to coating.

Figure 3:
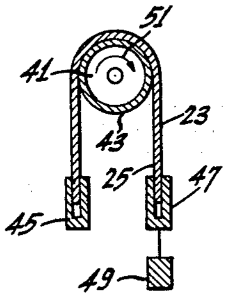

In order to compare the abrasion resistance of the coating with other coatings, the apparatus illustrated in FIGURE 3 is employed. The coating 25 of a strip of completed recording element 0.25 inch wide and several inches long, is placed around a drum 41 having an abrasive surface 43. One end of the strip is held in a fixed position by a first clamp 45. The other end of the strip is held freely by a second clamp 47 to which a weight 49 is attached. The drum 41 is rotated in the direction indicated by the arrow 51. The time required to abrade through the coating is noted and provides the comparative abrasion resistance value of the particular coating. The longer the time, the greater the abrasion resistance. The table at the end of the specification enumerates the comparative abrasion resistance of some magnetic tapes of the invention and of the prior art.

The following examples of recording elements of the invention may be prepared in the apparatus of FIGURE 2.

*Example 1.*—A coating mixture is prepared by first ball milling for 40 hours the following ingredients to produce a dispersion; 700 grams of acicular iron oxide such as IRN 110, marketed by C. K. Williams Co., Easton, Pa., 100 grams of a vinyl alcohol-vinyl acetate-vinyl chloride copolymer, such as Vinylite VAGH, marketed by the Bakelite Co., South Charleston, W. Va., and 600 grams of methyl ethyl ketone. Then add to this dispersion 200 grams of a polyalkyleneether-isocyanate-based polymer, such as Adiprene L100 marketed by E. I. du Pont de Nemours and Co., Wilmington, Del., and 18 grams of 4,4′-methylene-bis-(2-chloroaniline) dissolved in enough toluene to adjust the viscosity of the mixture to 1000 to 2000 cps. (centipoises) at room temperature to produce the coating mixture. Coating should be carried out as soon as possible after the last ingredient is mixed into the dispersion.

A continuous base 23 of an oriented polyethylene terephthalate film 1.5 mils thick and 6 inches wide is moved at a speed of about 100 feet per minute through the apparatus of FIGURE 2. The coating mixture is applied by the doctor blade 31 and the wet coating is dried with forced air in the dryer 37 at about 90° C. The completed structure is then cooled to room temperature and wound on the take-up roller 29. Curing is completed by holding the completed structure for 6 hours at about 80° C. The results of the abrasion resistance test on the completely cured coating and its retentivity is shown in the table.

*Example 2.*—A coating mixture is prepared by first ball milling for 30 hours the following ingredients to produce a dispersion: 600 grams of an acicular magnetite, 120 grams of a vinyl alcohol-vinylacetate-vinyl chloride such as Vinylite VAGH and 550 grams of methyl ethyl ketone. Then, to this dispersion add 120 grams of a polyalkyleneether-isocyanate-based polymer, such as Adiprene L100, 120 grams of a polyalkylene-ether-isocyanate-based polymer, such as Adiprene L167, both marketed by E. I. du Pont de Nemours and Co., Wilmington, Del., and enough methyl ethyl ketone to adjust the viscosity of the mixture to 1000 to 2000 cps. at room temperature to produce a coating mixture. The coating mixture is coated and dried as in Example 1. After winding the coated base on the take-up roller 29, curing is completed by storing the coating for about 36 hours at about 40° C. and about 95% relative humidity.

*Example 3.*—A coating mixture is prepared by ball milling for 50 hours the following ingredients to produce a dispersion: 700 grams of an acicular zinc ferrous ferrite, 100 grams of a vinyl alcohol-vinyl acetate-vinyl chloride copolymer, such as Vinylite VAGH, 600 grams methyl ethyl ketone. Then, to this dispersion 230 grams of a polyalkyleneether-isocyanate-based polymer, such as Adiprene L100, marketed by E. I. du Pont de Nemours and Co., Wilmington, Del., and 21 grams of 4,4′-methylene-bis-(2-chloroaniline) and enough toluene to adjust the viscosity of the coating mixture to 1000–2000 cps. at room temperature, are added to the dispersion. After winding the coated base on the take-up roller 29, curing is completed by holding the coating for about 8 hours at about 75° C.

*Abrasion Resistance and Retentivity of Magnetic Coatings*

| Matrix | Elastomer | Magnetic Material | Milling Time | Abrasion Resistance (seconds) | Retentivity (Gauss) | Ex. No. |
|---|---|---|---|---|---|---|
| Vinyl alcohol-vinyl acetate-vinyl chloride copolymers. | Diisocyanate-based elastomer | $\gamma$-$Fe_2O_3$ | 40 | 300 | 1,100 | 1 |
| None | Diisocyanate-based elastomer | $\gamma$-$Fe_2O_3$ | 40 | >600 | 950 | ------ |
| Vinyl alcohol-vinyl acetate-vinyl chloride copolymer. | None | $\gamma$-$Fe_2O_3$ | 40 | 10 | 1,100 | ------ |
| Vinyl alcohol-vinyl acetate-vinyl chloride copolymer. | Diisocyanate-based elastomer | Magnetite | 30 | 250 | 1,000 | 2 |
| Vinyl alcohol-vinyl acetate | Diisocyanate-based elastomer | Zinc ferrous ferrite | 50 | 300 | 1,200 | 3 |

What is claimed is:

1. A magnetic recording element comprising a base and a coating upon a surface of said base, said coating comprising magnetic particles in a binder, said binder consisting essentially of 5 to 75 weight percent of a polymeric matrix material and the balance of a diisocyanate-based elastomer, said matrix material having a molecular weight of at least 2000 and consisting essentially of at least one solid, soluble, thermoplastic copolymer of from 0.5 to 50 weight percent vinyl alcohol and the balance at least one member of the group consisting of vinyl esters, vinyl acetals, vinyl halides and vinylidene halides, said diisocyanate-based elastomer consisting essentially of interconnected units having the formula:

$$\left[-NX-\left(B-NH-\overset{O}{\overset{\|}{C}}-O-G-O-\overset{O}{\overset{\|}{C}}-NH\right)_n-\left(B-NX-R\right)_m-\right]$$

wherein O—G—O is a bivalent, polymeric radical obtained by removing the terminal active hydrogen atoms from an organic compound having a molecular weight of at least 750 selected from the group consisting of: (1) polyalkyleneether glycols, (2) polyalkylene-aryleneether glycols, (3) polyalkyleneether-thioether glycols, (4) polyalkylene-aryleneether-thioether glycols, (5) linear, dihydroxy-terminated polyesters, (6) linear, dihydroxy-terminated polyester amides; B is a bivalent, non-polymeric, organic radical which is inert to isocyanate groups and which is selected from the group consisting of aromatic, aliphatic, and cycloaliphatic radicals, and combinations thereof; R is a bivalent radical selected from the group consisting of carbonyl, non-polymeric diacyl radicals and non-polymeric dicarbamyl radicals; X is at least one radical selected from the group consisting of hydrogen radical and bivalent radicals consisting of non-polymeric dicarbamyl radicals and of polymeric dicarbamyl radicals where said polymeric dicarbamyl radicals consist essentially of units having the general formula:

$$-\overset{O}{\overset{\|}{C}}-NH-(B-NH-\overset{O}{\overset{\|}{C}}-O-G-O-\overset{O}{\overset{\|}{C}}-NH)_n-B-NH-\overset{O}{\overset{\|}{C}}-$$

and where $n$ and $m$ are integers and $n/m$ is between 1 and 1000.

2. The recording element of claim 1 wherein the magnetic particles consist essentially of acicular magnetic particles of the oxidic type between 0.2 and 2.0 microns long with an average length-to-width ratio of about 2 to 20.

3. The recording element of claim 2 wherein the magnetic particles are gamma iron oxide.

4. The recording element of claim 2 wherein said base is a polyester base and wherein the bivalent non-polymeric organic radical B is a 2,4-tolylene radical.

5. The recording element of claim 2 wherein the bivalent, polymeric radical is obtained by removing the terminal active hydrogen atoms from a polyalkyleneether glycol having a molecular weight of at least 750.

6. The recording element of claim 5 wherein the polyalkyleneether glycol is a polytetramethyleneether glycol.

7. The recording element of claim 2 wherein the polymeric matrix material is a vinyl alcohol-vinyl acetate-vinyl chloride copolymer.

8. The recording element of claim 2 wherein the bivalent radical R is a non-polymeric dicarbamyl radical.

9. The recording element of claim 8 where the non-polymeric dicarbamyl radical is a 4,4'-methylene-bis-(2-chlorophenylcarbamyl) radical.

10. The recording element of claim 2 wherein X consists of hydrogen radicals and of bivalent polymeric dicarbamyl radicals of the formula $$-CO-NH-(B-NH-CO-O-G-O-CO-NH)_n-B-NH-CO-$$

and the molar ratio of hydrogen to said bivalent polymeric dicarbamyl radical is between 1 and 2000.

11. The recording element of claim 10 where the ratio of hydrogen to said bivalent polymeric dicarbamyl radicals is approximately 1.

12. A method for preparing a magnetic recording element including the steps of providing a coating mixture comprising magnetic particles dispersed in a non-aqueous solvent containing a soluble, hydroxyl-group-bearing polymeric matrix material having a molecular weight of at least 2000 and an isocyanate-terminated prepolymer having the formula:

$$OCN-(B-NH-CO-O-G-O-CO-NH-B)_n-NCO$$

wherein O—G—O is a bivalent, polymeric radical obtained by removing the terminal active hydrogen atoms from a polymeric organic compound having a molecular weight of at least 750 selected from the group consisting of: (1) polyalkyleneether glycols, (2) polyalkylenearyleneether glycols, (3) polyalkyleneether-thioether glycols, (4) polyalkylenearyleneether-thioether glycols, (5) linear, dihydroxy-terminated polyesters, and (6) linear, dihydroxy-terminated polyester amides; B is a bivalent, non-polymeric organic radical which is inert to isocyanate groups and which is selected from the group consisting of aromatic, aliphatic, and cycloaliphatic radicals, and combinations thereof, and $n$ is an integer between 1 and 100, said matrix material consisting essentially of a copolymer containing 0.5 to 50 weight percent vinyl alcohol and the balance at least one member of the group consisting of vinyl esters, vinyl acetals, vinyl halides, and vinylidene halides, coating said coating mixture upon a base, removing the solvent from said coating, and then reacting said prepolymer with a non-polymeric bifunctional compound selected from the group consisting of glycols, diamines, amino-alcohols, and water to produce a cross-linked diisocyanate-based elastomer, said matrix material constituting about 5 to 75 weight percent of the total weight of said matrix material, said prepolymer, and said bifunctional compound.

13. The method of claim 12 wherein said bifunctional compound is included in said coating mixture.

14. The method of claim 12 wherein said bifunctional compound is included in an ambient atmosphere for said reaction step.

15. A method for preparing a magnetic recording element including the steps of providing a coating mixture comprising magnetic particles dispersed in a non-aqueous solvent containing a soluble, hydroxyl-group bearing polymeric matrix material having a molecular weight of at least 2000 and an isocyanate-terminated prepolymer having the formula:

OCN—(B—NH—CO—O—G—O—CO—NH—B)$_n$—NCO wherein O—G—O is a bivalent, polymeric radical obtained by removing the terminal active hydrogen atoms from a polymeric organic compound having a molecular weight of at least 750 selected from the group consisting of: (1) polyalkyleneether glycols, (2) polyalkylenearyleneether glycols, (3) polyalkyleneether-thioether glycols, (4) polyalkylenearyleneether-thioether glycols, (5) linear, dihydroxy-terminated polyesters, and (6) linear, dihydroxy-terminated polyester amides; B is a bivalent, nonpolymeric organic radical which is inert to isocyanate groups and which is selected from the group consisting of aromatic, aliphatic, and cycloaliphatic radicals, and combinations thereof, and *n* is an integer between 1 and 100, said matrix material consisting essentially of a soluble thermoplastic copolymer containing 0.5 to 50 weight percent vinyl alcohol and the balance at least one member of the group consisting of vinyl esters, vinyl acetals, vinyl halides and vinylidene halides, coating said coating mixture upon a base, drying said coating to non-tackiness, winding said coated base into a roll, and then curing said coating while in its rolled form by reacting said prepolymer with a bifunctional compound selected from the group consisting of glycols, diamines, amino-alcohols, and water, to produce a cross-linked diisocyanate-based elastomer, said matrix material constituting about 5 to 75 weight percent of the total weight of said matrix material, said prepolymer, and said bifunctional compound.

16. A method for preparing a magnetic recording element comprising dispersing magnetic particles in a non-aqueous solvent containing a soluble hydroxyl-group-bearing polymeric matrix material having a molecular weight of at least 2000, and an isocyanate-terminated prepolymer having the formula:

OCN—(B—NH—CO—O—G—O—CO—NH—B)$_n$—NCO wherein O—G—O is a bivalent, polymeric radical obtained by removing the terminal active hydrogen atoms from a polymeric organic compound having a molecular weight of at least 750 selected from the group consisting of: (1) polyalkyleneether glycols, (2) polyalkylenearyleneether glycols, (3) polyalkyleneether-thioether glycols, (4) polyalkylenearyleneether-thioether glycols, (5) linear, dihydroxy-terminated polyesters, and (6) linear, dihydroxy-terminated polyester amides; B is a bivalent, nonpolymeric organic radical which is inert to isocyanate groups and which is selected from the group consisting of aromatic, aliphatic, and cycloaliphatic radicals, and combinations thereof, and *n* is an integer between 1 and 100, said matrix material consisting essentially of a soluble thermoplastic copolymer containing 0.5 to 50 weight percent vinyl alcohol and the balance at least one member of the group consisting of vinyl esters, vinyl acetals, vinyl halides, and vinylidene halides, adding to said dispersion a non-polymeric bifunctional compound selected from the group consisting of glycols, diamines, amino-alcohols, and water in an amount insufficient to react with all of the free NCO groups of said prepolymer to produce a coating mixture, coating said coating mixture upon a base, drying said coating by removing the solvent therefrom, winding said coated base into a roll, and curing said coating while in its rolled condition, by reacting said prepolymer with said bifunctional compound, said matrix material constituting about 5 to 75 weight percent of the total weight of said matrix material, said prepolymer, and said bifunctional compound.

17. The method of claim 16 wherein said curing is carried out by storing said roll at temperatures between 40 and 130° C. for at least 2 hours.

18. A method for preparing a magnetic recording element comprising dispersing magnetic particles in a non-aqueous solvent containing a soluble hydroxyl-group-bearing polymeric matrix material having a molecular weight of at least 2000 and an isocyanate-terminated prepolymer having the formula:

OCN—(B—NH—CO—O—G—O—CO—NH—B)$_n$—NCO wherein O—G—O is a bivalent, polymeric radical obtained by removing the terminal active hydrogen atoms from a polymeric organic compound having a molecular weight of at least 750 selected from the group consisting of: (1) polyalkyleneether glycols, (2) polyalkylenearyleneether glycols, (3) polyalkyleneether-thioether glycols, (4) polyalkylenearyleneether-thioether glycols, (5) linear, dihydroxy-terminated polyesters, and (6) linear, dihydroxy-terminated polyester amides; B is a bivalent, non-polymeric organic radical which is inert to isocyanate groups and which is selected from the group consisting of aromatic, aliphatic, and cycloaliphatic radicals and combinations thereof, and *n* is an integer between 1 and 100 to produce a coating mixture, said matrix material consisting essentially of a soluble thermoplastic copolymer containing 0.5 to 50 weight percent vinyl alcohol and the balance at least one member of the group consisting of vinyl esters, vinyl acetals, vinyl halides, and vinylidene halides, coating said coating mixture upon a base, drying said coating by removing the solvent therefrom, winding said coated base into a roll, and then curing said coating while in its rolled condition, by reacting said prepolymer with a bifunctional compound selected from the group consisting of glycols, diamines, amino-alcohols, and water, contained in an ambient atmosphere, said matrix material constituting about 5 to 75 weight percent of the total weight of said matrix material, said prepolymer, and said bifunctional compound.

19. The method of claim 18 wherein said curing is carried out by storing said roll in air at temperatures between 10 and 110° C. having a relative humidity between 60 and 100% for at least 12 hours.

20. The method of claim 18 wherein said curing is carried out by storing said roll in air at room temperature having a relative humidity between 60 and 100% for at least 12 hours.

References Cited in the file of this patent

UNITED STATES PATENTS

| | | |
|---|---|---|
| 2,454,678 | Smith et al. | Nov. 23, 1948 |
| 2,512,726 | Penn | June 27, 1950 |
| 2,606,162 | Coffey et al. | Aug. 5, 1952 |
| 2,806,835 | Nischk et al. | Sept. 17, 1957 |
| 2,806,836 | Nischk et al. | Sept. 17, 1957 |
| 2,882,260 | Bartl et al. | Apr. 14, 1959 |
| 2,888,433 | Parker | May 26, 1959 |
| 2,891,876 | Brown et al. | June 23, 1959 |
| 2,948,707 | Benning | Aug. 9, 1960 |
| 2,978,414 | Harz | Apr. 4, 1961 |
| 3,001,891 | Stoller | Sept. 26, 1961 |
| 3,024,216 | Smitmans et al. | Mar. 6, 1962 |

FOREIGN PATENTS

| | | |
|---|---|---|
| 814,225 | Germany | Sept. 20, 1951 |
| 717,537 | Great Britain | Oct. 27, 1954 |
| 585,378 | Canada | Oct. 20, 1959 |

OTHER REFERENCES

Golding, B.: Polymers and Resins, Van Nostrand Co., Inc., New York, 1959, pages 325–335. TP 156.P 6 G 6.

Dombrow: Polyurethanes, Reinhold Publishing Corp., New York, 1957, page 142. QD 305 A 2 D 6 C.5.